(12) United States Patent
Cui

(10) Patent No.: US 12,561,461 B2
(45) Date of Patent: Feb. 24, 2026

(54) PIN-LEVEL ENCRYPTION FOR ELECTRICAL SYSTEMS

(71) Applicant: RED BALLOON SECURITY, INC., New York, NY (US)

(72) Inventor: Ang Cui, New York, NY (US)

(73) Assignee: RED BALLOON SECURITY, INC., New York, NY (US)

( * ) Notice: Subject to any disclaimer, the term of this patent is extended or adjusted under 35 U.S.C. 154(b) by 140 days.

(21) Appl. No.: 18/307,491

(22) Filed: Apr. 26, 2023

(65) Prior Publication Data

US 2023/0267221 A1 Aug. 24, 2023

Related U.S. Application Data

(63) Continuation of application No. 16/533,473, filed on Aug. 6, 2019, now Pat. No. 11,657,169.

(51) Int. Cl.
| | |
|---|---|
| *G06F 21/62* | (2013.01) |
| *G06F 21/10* | (2013.01) |
| *G06F 21/60* | (2013.01) |
| *G06F 21/72* | (2013.01) |

(52) U.S. Cl.
CPC ........ *G06F 21/6209* (2013.01); *G06F 21/602* (2013.01); *G06F 21/72* (2013.01); *G06F 21/107* (2023.08)

(58) Field of Classification Search
CPC .... G06F 21/6209; G06F 21/602; G06F 21/72; G06F 21/107; G06F 21/606

USPC ........................................................... 726/27
See application file for complete search history.

(56) References Cited

U.S. PATENT DOCUMENTS

| | | | | |
|---|---|---|---|---|
| 6,480,602 B1* | 11/2002 | Dupuis | ............... | H04L 25/0266 |
| | | | | 379/90.01 |
| 8,473,754 B2* | 6/2013 | Jones | ...................... | G06F 21/53 |
| | | | | 713/171 |
| 8,555,082 B1* | 10/2013 | Bibikar | ................. | G06F 21/575 |
| | | | | 713/189 |
| 11,005,828 B1* | 5/2021 | Kapp | ...................... | G06F 21/64 |
| 2003/0026433 A1* | 2/2003 | Matt | ..................... | H04L 9/0866 |
| | | | | 380/278 |
| 2006/0029228 A1* | 2/2006 | Lagrange | ............... | H04N 7/163 |
| | | | | 380/201 |
| 2006/0059372 A1* | 3/2006 | Fayar | ..................... | G06F 21/72 |
| | | | | 713/192 |
| 2007/0143593 A1* | 6/2007 | Cardoso | .................... | H04L 9/12 |
| | | | | 713/150 |
| 2008/0130893 A1* | 6/2008 | Ibrahim | ............... | G06F 21/572 |
| | | | | 380/277 |
| 2011/0138192 A1* | 6/2011 | Kocher | .................. | H04L 9/003 |
| | | | | 713/189 |

(Continued)

*Primary Examiner* — Amare F Tabor

(74) *Attorney, Agent, or Firm* — Sheppard, Mullin, Richter & Hampton LLP

(57) ABSTRACT

A system and method of providing pin-level encryption to low-information signals is provided. The system comprises a first system communicatively coupled to a second system. The first system comprises a signal generator configured to generate a signal having a complexity and a mixer circuit configured to receive a key, create a secured message by applying the key to the signal, and transmit the secured message to the second system. The secured message has a complexity that is higher than the complexity of the signal.

19 Claims, 8 Drawing Sheets

(56)         References Cited

U.S. PATENT DOCUMENTS

| | | |
|---|---|---|
| 2012/0159160 A1 | 6/2012 | Poisner |
| 2018/0026948 A1* | 1/2018 | Lazecky ................... H04L 9/00 713/168 |

* cited by examiner

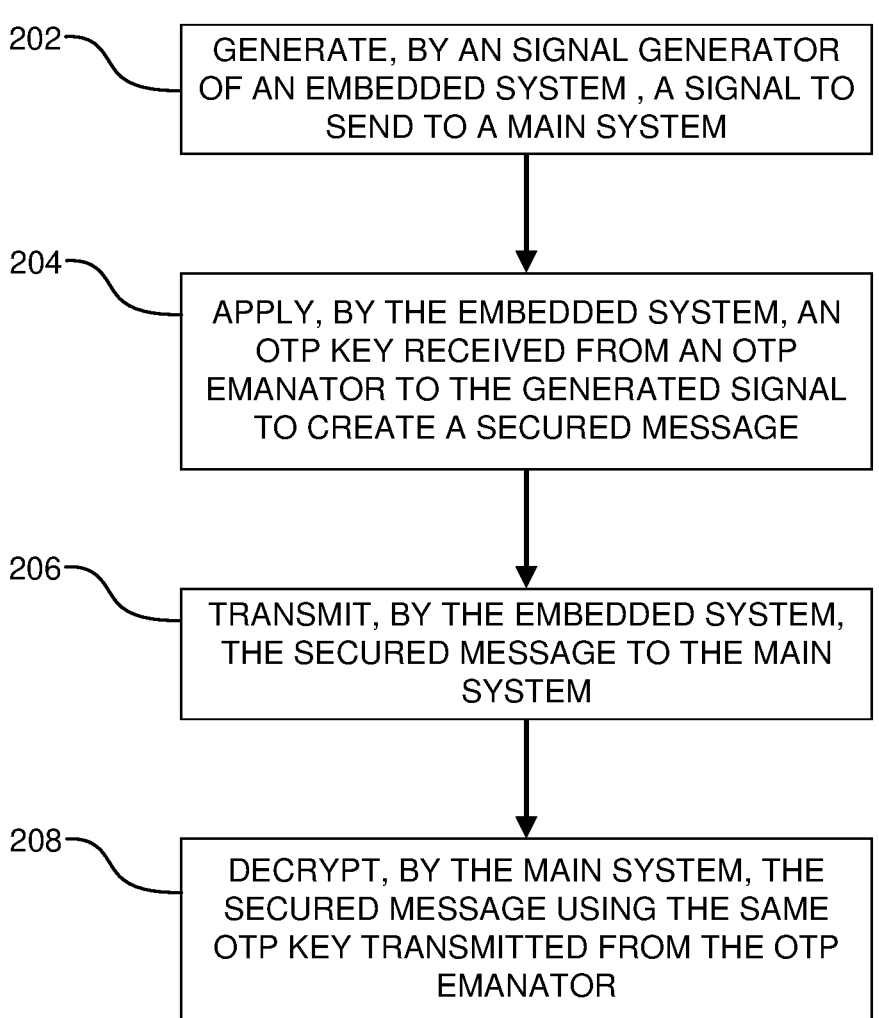

200

202 — GENERATE, BY AN SIGNAL GENERATOR OF AN EMBEDDED SYSTEM , A SIGNAL TO SEND TO A MAIN SYSTEM

204 — APPLY, BY THE EMBEDDED SYSTEM, AN OTP KEY RECEIVED FROM AN OTP EMANATOR TO THE GENERATED SIGNAL TO CREATE A SECURED MESSAGE

206 — TRANSMIT, BY THE EMBEDDED SYSTEM, THE SECURED MESSAGE TO THE MAIN SYSTEM

208 — DECRYPT, BY THE MAIN SYSTEM, THE SECURED MESSAGE USING THE SAME OTP KEY TRANSMITTED FROM THE OTP EMANATOR

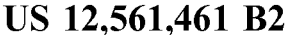
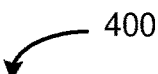
400
Processor(s)
404
Network
Interface(s)
418
Bus
402
Main
Memory
406
ROM
408
Storage
410
Display
412
Input
Device(s)
414
Cursor
Control
416
FIG. 4

PIN-LEVEL ENCRYPTION FOR ELECTRICAL SYSTEMS

REFERENCE TO RELATED APPLICATION

The present application is a continuation of and claims priority to U.S. patent application Ser. No. 16/533,473, filed on Aug. 6, 2019 and titled "PIN-LEVEL ENCRYPTION FOR ELECTRICAL SYSTEMS," which is incorporated herein by reference in its entirety.

BACKGROUND

Increasingly, embedded systems are being integrated into modern devices, generally a microcontroller or micropro- cessor based system designed to perform a specific task. Embedded systems comprise application-specific software and a set of hardware components (e.g., a processor) to run the application software. Some embedded systems employ a real time operating system (RTOS) to supervise the appli- cation software and define the way the embedded system operates. Security and protection mechanisms are generally included within the embedded systems to detect and/or protect against attackers. These security mechanisms them- selves are generally rooted in the software itself. A vulner- ability in any of those components could compromise the trustworthiness of the security mechanisms that rely upon those components.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is an example method for securing a signal between two systems in accordance with embodiments of the technology disclosed herein.

FIG. 4 is an example computing system in which embodi- ments described in the present disclosure may be imple- mented.

Figure 1A:
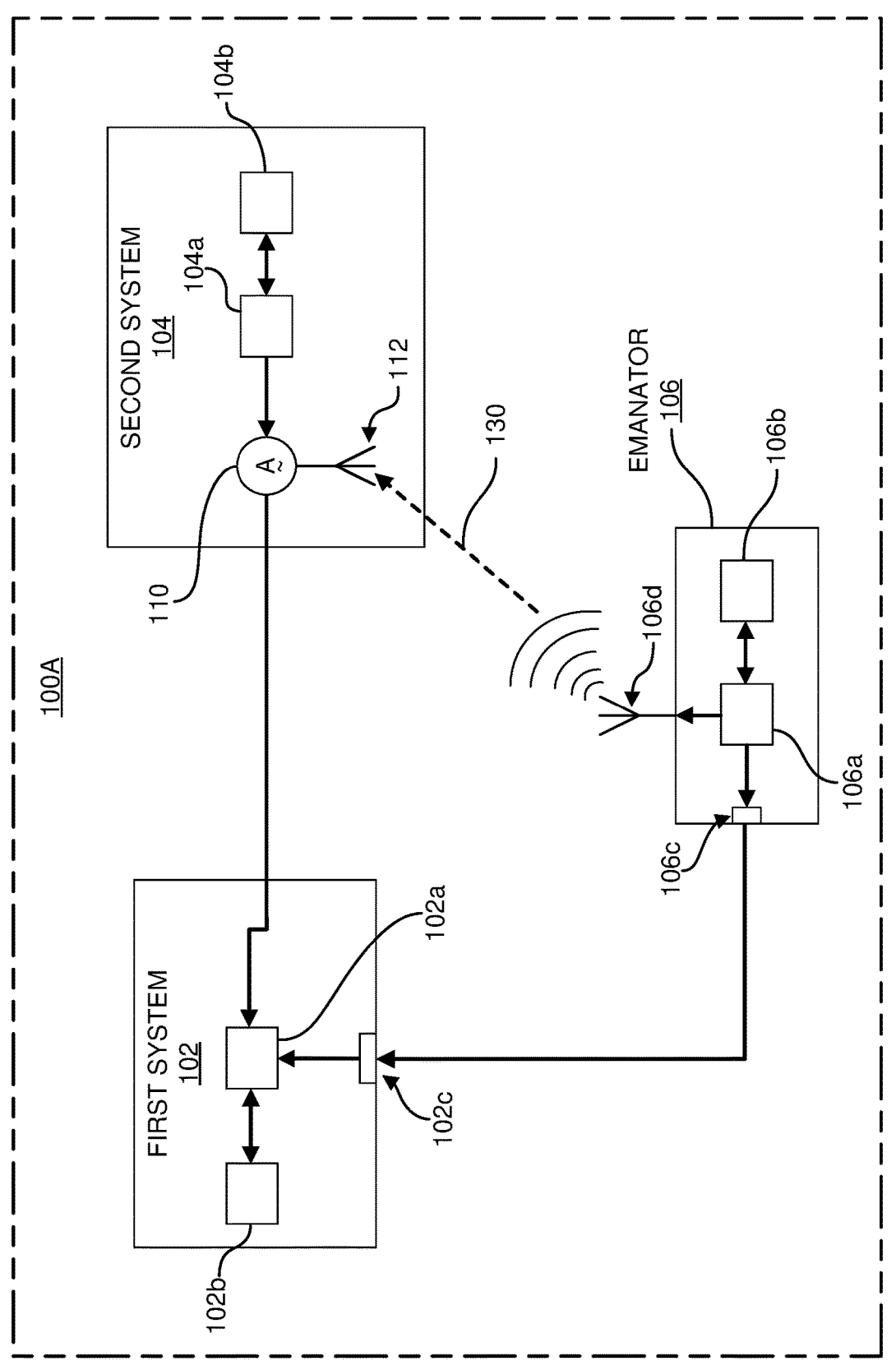
FIG. 1A is an example environment in accordance with embodiments of the technology disclosed herein.

The figures are not exhaustive and do not limit the present disclosure to the precise form disclosed.

DETAILED DESCRIPTION

It is commonly known how to scramble or encrypt complex data signals, such as high-frequency analog signals or complex digital signals, respectively. For purposes of this disclosure, the term "encryption" is used generally to refer to the process of transforming a data signal such that only the intended target can reverse the transformation, encom- passing both digital encryption and analog scrambling. For example, email traffic is commonly encrypted using an encryption scheme (e.g., advanced encryption standard (AES), triple data encryption standard (3DES), or RSA) such that the transmitted signal looks like random noise to a would-be interceptor. Encryption algorithms take the plaintext and encrypts the information using a cipher to generate ciphertext that can only be read if decrypted using a corresponding decryption key. For analog signals, a known noise signal, generated by a given scrambling code, is added to the signal, making it difficult to separate the noise from the underlying signal if intercepted. Although encryption does not prevent interference, it does minimize the ability of a would-be interceptor to intelligibly obtain the underlying message without considerable computational resources and skill.

However, similar encryption techniques are not as effec- tive or, in some situations, practical for low-information or simple data signals that do not carry a great deal of infor- mation. Because changes in the signal occur infrequently, and there is a limited amount of data being transmitted, it is easier to determine the underlying information when inter- cepted, as opposed to when the signal contains more infor- mation. Moreover, for digital binary inputs/outputs (I/O), having only two states reduces the ability to effectively obfuscate the underlying message. Non-limiting examples of these types of signals include POWER and RESET pins, which generally have HIGH-LOW or LOW-HIGH transi- tions only. It is essentially mathematically impossible to encrypt simple, binary outputs and/or inputs because there is not enough variation in the data. No matter how the data is adjusted, only two signals will be generated, and it is often trivial to determine which is which.

Although attackers generally attempt to exploit vulner- abilities associated with data stream transmission (i.e., com- plex messages that are continuously being transmitted) when seeking to intercept communications in transit, simple sig- nals (e.g., RESET pins) presents a low-level vulnerability to embedded systems. These types of simple signals are gen- erally present within embedded systems and are often used to indicate simple messages, such as indications of autho- rized access or proper functioning from a security mecha- nism (e.g., a hardware root of trust). Hardware roots of trust are highly reliable hardware, firmware, and software com- ponents that perform specific, critical security functions. Hardware roots of trust provide a trusted execution envi- ronment for privileged software to run and are designed to be tamper-proof (i.e., attempts to tamper result in detectable malfunction of the component). However, low-information and/or simple data signals may be transmitted from hard- ware roots of trust to other components of an embedded system to indicate successful operation and, once egressed from the tamper proof environment, could be intercepted. As a non-limiting example, the authentication mechanism of an electronic lock could be implemented which, upon authen- ticating a keycard, sets the POWER pin from LOW-to- HIGH to indicate a successful authentication and provide power to the latch mechanism to open the door. An attacker could either tap the connection or, if wirelessly transmitted, capture the signal and spoof the signal to cause the locking mechanism to activate without proper authentication. There- fore, it is possible for an attacker to intercept such signals and identify a method of hijacking the component's opera- tion, facilitating intrusion of the system.

An example of this type of attack concerns a recently discovered vulnerability in trust anchor modules. A trust anchor is an authoritative entity for which trust is assumed and not derived. One such example implementation is Cisco's® Trust Anchor module (TAm), a hardware security chip part of many Cisco® devices. The TAm is the root of trust and runs from separate, special-purpose hardware-isolated component that cryptographically verifies that the bootloader that loads and executes on the device is authentic. The TAm is implemented as an external field-programmable gate array (FPGA). However, a vulnerability called "Thrangrycat" allows an attacker to make persistent modification to the TAm via FPGA bitstream modification, thereby defeating the secure boot process and invalidating the chain of trust at its root. Because the flaws reside in the hardware design, it is unlikely that any software security patch would fully resolve the fundamental security vulnerability. Using Thrangrycat, it is possible for an attacker to alter FPGA behavior without any need to perform register-transfer level (RTL) reconstruction. Superficially, the vulnerability allows an attacker to link a low-information output pins to POWER or GROUND, indicating success or failure in spite of the results of the FPGA's encoded algorithm. This allows for persistent FPGA implants, physical destruction of embedded systems, and attacks against FPGA-based systems, such as software-defined radios, advanced automotive driver assist modules, weapon guidance systems, and more.

Embodiments of the technology disclosed herein provide systems and methods for encrypting low-information digital outputs at the analog pin-level. As discussed in greater detail herein, an output signal is combined with a longer one-time pad (OTP) signal to generate an encrypted signal output from an analog pin (e.g., POWER or RESET). The OTP key is transmitted to both the transmitting device and the receiving device. After encrypting the data using the OTP key, the signal is transmitted from the transmitting device and decrypted using the OTP key by the receiving device. Accordingly, even if an attack was to intercept the low-information signal, the data would appear as noise. By utilizing an OTP key as long as or longer than the underlying message, embodiments in accordance with the present disclosure increases the difficulty in deciphering the minimal number of output states because a given output state would appear differently for each transmission.

FIG. 1A illustrates an example environment 100 in which embodiments of the present disclosure may be implemented. Environment 100 shows only those elements relevant for explaining the technology disclosed herein, and should not be interpreted as limiting the scope of embodiments of the present disclosure. Although not pictured in FIG. 1A, a person of ordinary skill in the art would know that environment 100 would include additional elements in various embodiments depending on the implementation. As non-limiting examples, environment 100 may include machine-readable memories, additional processors, sensors, and other computing elements common to a given implementation. Environment 100 may be any environment comprising one or more embedded systems dedicated to performing one or more functions and which transmit and/or receive low-information signals. Some non-limiting examples of environment 100 includes ATMs, electronic locks (e.g., hotel doors, safes, etc.), military systems (e.g., radar, weapons guidance and control, etc.), home appliances, networking equipment, among others. The embodiments disclosed herein can be implemented to provide additional protection for important and/or mission critical components of such systems (e.g., hardware roots of trust, authentication mechanisms, cash dispensers, self-destruct functionality, etc.). Specifically, embodiments of the technology discussed herein enable pin-level encryption of low information signals, addressing a low-level vulnerability. Although discussed with respect to low information, simple signals, a person of ordinary skill in the art would appreciate that the technology disclosed herein is applicable to provide pin-level encryption for I/O pins configured for transmission of complex signals, as well. The technology disclosed herein is complementary to any standard encryption or scrambling techniques that may be used within an implementation. Nothing in this disclosure would be understood as incompatible with common encryption schemes by a person of ordinary skill in the art.

As shown in FIG. 1A, environment 100A includes a first system 102, a second system 104, and a emanator 106. In various embodiments, first system 102 and second system 104 may comprise embedded or non-embedded systems, each configured to perform specific functions for environment 100A. In various embodiments, first system 102 may be the source of a low information signal and second system 104 may be the second of the low information signal from first system 102, while in other embodiments first system 102 may be the second of a low information signal from target system 104 (which acts as the source). In various embodiments, first system 102 may be a main processor or controller configured to manage environment 100A. In various embodiments, second system 104 may comprise one or more components disposed on a printed circuit board (PCB) or other suitable substrate used in the field of electronics, in other embodiments second system 104 may comprise a system on chip (SoC). In some embodiments, second system 104 may comprise one or more devices, including but not limited to a switch, processor, logical unit, or other devices.

In various embodiments, first system 102 may comprise a computing device serving as a central processing entity within environment 100A, configured to send and receive signals from one or more other devices and/or embedded systems within environment 100A. As illustrated in FIG. 1A, first system 102 may include a main processor 102a and a machine-readable memory 102b. In various embodiments, main processor 102a may be one or more of a variety of processers known in the art, including but not limited to an application specific integrated circuit (ASIC), a field programmable gate array (FPGA), microcontroller, microprocessor, or other processing components. Main processor 102a is communicatively coupled to memory 102b storing non-transitory executable instructions defining (in software or firmware) functions to be performed by first system 102. In some embodiments first system 102 may comprise a system on chip (SoC) or other packaged computing device.

First system 102 may further include a wired input/output (I/O) interface 102c with an associated hardwired data port (not illustrated in FIG. 1A). As illustrated, wired I/O interface 102c may provide communication in one direction. Wired I/O interface 102c may include a receiver (not shown in FIG. 1A) configured to receive hardwired communications sent by a transmitter (not shown in FIG. 1A) of wired I/O interface 106c. Wired I/O interfaces 102c, 106c can communicate with other devices using Ethernet or any of a number of other wired communication protocols whether standardized, proprietary, open, point-to-point, networked or otherwise.

In various embodiments, first system 102 may be co-located with second system 104, emanator 106, or a combination thereof, while in other embodiments first system 102 may be located some distance away from, but within range to communicate with, second system 104 and emanator 106. As a non-limiting example, if environment 100A is implemented as an electronic lock on a door, first system

Figure 1B:
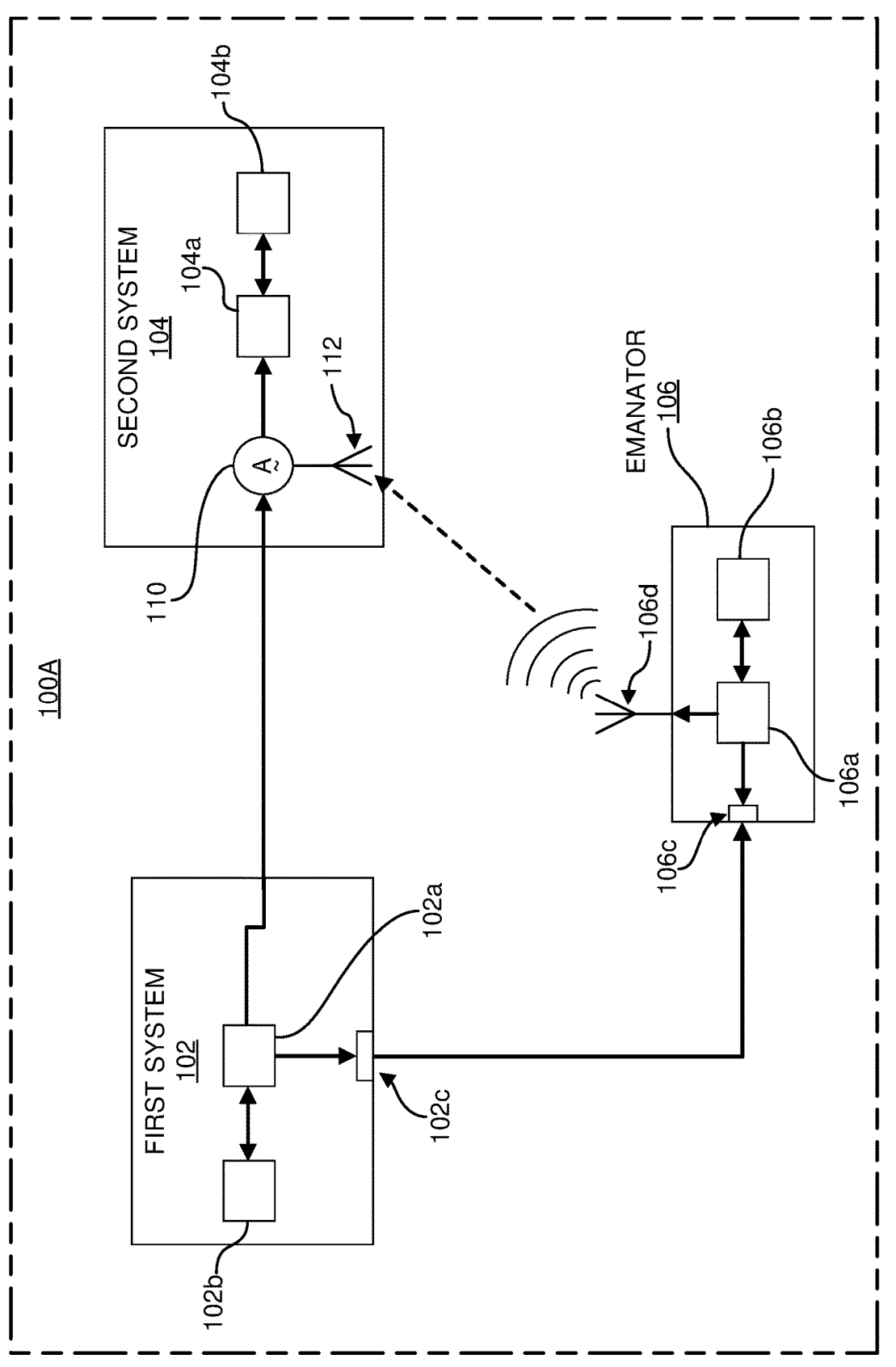
FIG. 1B is another example environment in accordance with embodiments of the technology disclosed herein.
Figure 1C:
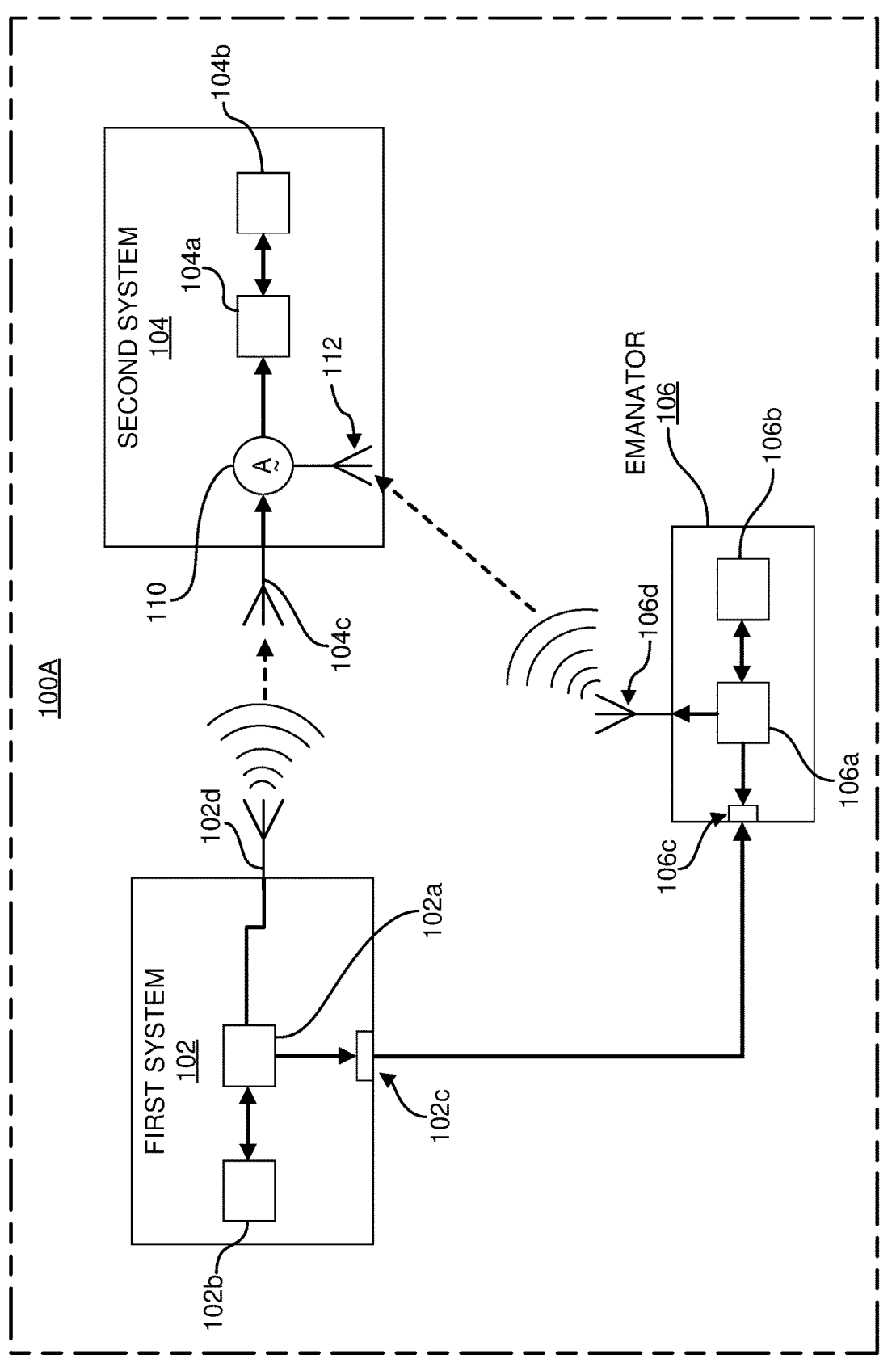
FIG. 1C is another example environment in accordance with embodiments of the technology disclosed herein.
Figure 1D:
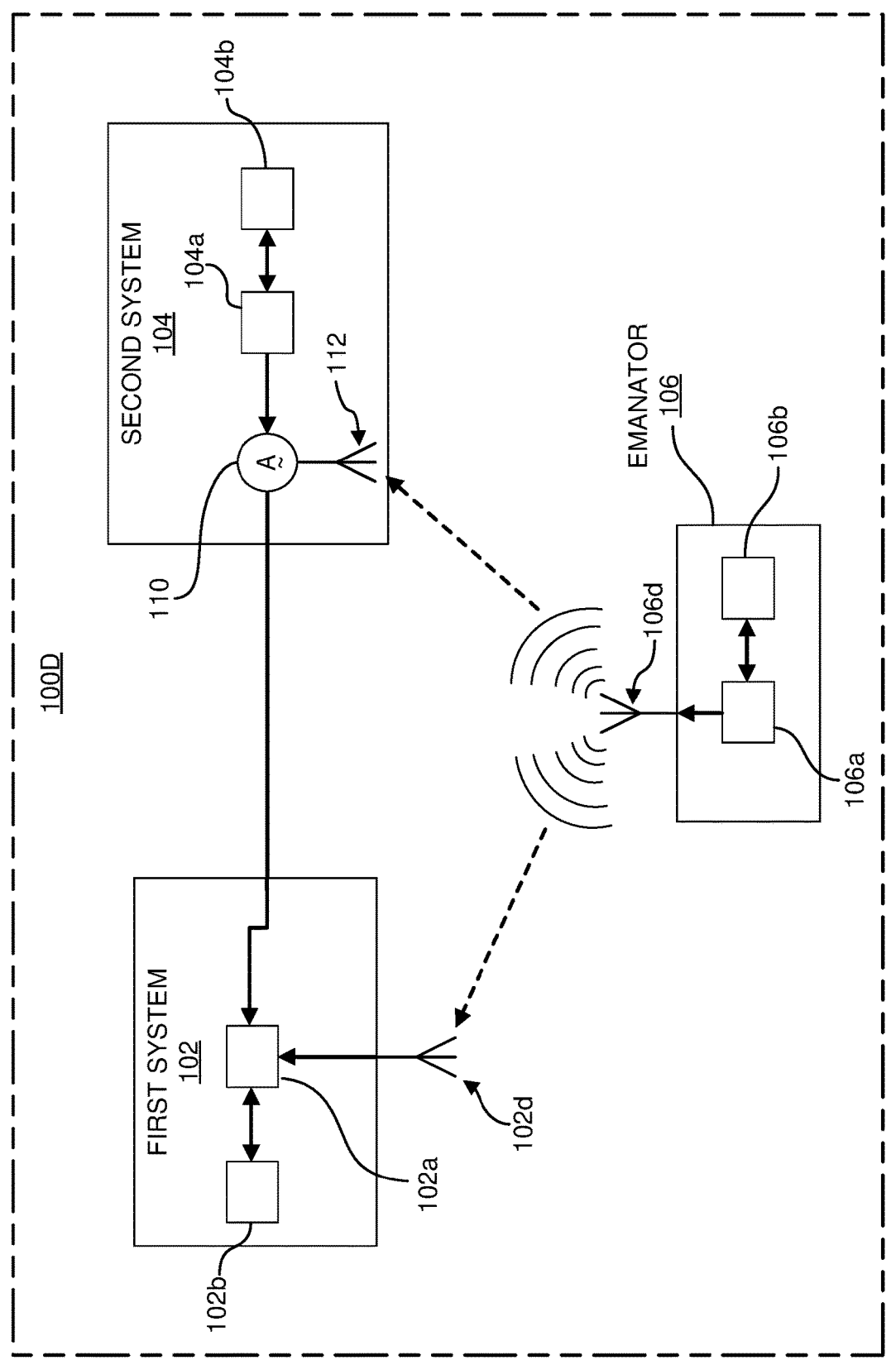
FIG. 1D is another example environment in accordance with embodiments of the technology disclosed herein.

102 and emanator 106 may be located within the wall, adjacent to the door frame, while second system 104 may be located within the door hardware and configured to run authentication software for a card reader on the door First system 102 is communicatively coupled to second system 104. As illustrated in FIG. 1A, first system 102 and second system 104 are coupled over a physical connection, including but not limited to, one or more transmission cables (e.g., coaxial, twisted pair, fiber optics, etc.), one or more electrical traces, one or more ribbon cables, or other physical connection types known in the art. In other embodiments, first system 102 and second system 104 may be coupled over a wireless connection, such as over first system antenna 102d and second system antenna 104c illustrated in FIG. 1C. In various embodiments, the communication link between first system 102 and second system 104 may be unidirectional. As a non-limiting example, FIG. 1A illustrates a unidirectional connection from second system 104 to first system 102. As another non-limiting example, FIG. 1B illustrates the reverse situation, with the unidirectional connection flowing from the first system 102 to second system 104. In various embodiments, both unidirectional links illustrated in FIGS. 1A and 1B may be included within an implementation, enabling two-way communication, while in other embodiments the communication link may be bidirectional, enabling messages to be sent to and received from each system (i.e., first system 102 and second system 104). As illustrated in FIG. 1D, in some embodiments the communication link between emanator 106 and first system 102 may be a wireless link, similar to the wireless link between emanator 106 and second system 104.

Second system 104 may be any type of digital computer, embedded system, non-embedded system, or other signal source present within a system (e.g., environment 100) that is configured to perform one or more dedicated functions. In various embodiments, second system 104 may be a security mechanism of environment 100A, while in other embodiments, second system 104 may be a performance mechanism of environment 100A. A person of ordinary skill in the art would understand the applicability of the technology disclosed herein to facilitate securing any low information transmission between performance mechanism and security mechanisms. In various embodiments, one or more second system 104 may be included within environment 100A, each second system 104 being communicatively coupled to first system 102 and configured to provide secure low information signal transmissions as discussed in greater detail below.

For ease of discussion, the technology disclosed herein shall be discussed with second system 104 comprising a hardware root of trust. This should not be interpreted as limiting the scope of the technology disclosed herein to only being applicable to hardware roots of trust. A person of ordinary skill in the art would understand that the technology disclosed herein is applicable to protecting any low-information communication within a given system. As illustrated in FIG. 1A, second system 104 may include a signal generator 104a and a dedicated machine-readable memory 104b. In various embodiments, signal generator 104a is configured to perform one or more discrete functions within environment 100A, comprising one or more pins configured to transmit and/or receive low information signals (e.g., a RESET signal, "dispense cash" signal in an ATM, etc.). In some embodiments, signal generator 104a may comprise one or more processors and configured to execute one or more software and/or firmware processes stored on dedicated memory 104b. In this way, second system 104 provides a secure execution environment in which the stored software and/or firmware may execute in a trusted manner. In various embodiments, one or more dedicated machine-readable memories 104b and/or one or more signal generators 104a may be included within second system 104. In such embodiments, each signal generator 104a may be configured to perform one or more discrete functions of second system 104.

Second system 104 provides a dedicated and trusted environment within which signal generator 104a may execute one or more discrete functions in a trustworthy manner. In various embodiments, signal generator 104a may include one or more actuators, sensors, and/or other devices required to perform the one or more dedicated functions of second system 104. A person of ordinary skill in the art would understand that embodiments of the technology disclosed herein are applicable to secure any system wherein low information signals providing limited variation in inputs and/or outputs are present. Moreover, such a person would understand that the technology of the present disclosure is not dependent on the specific elements signal generator 104a, nor the functionality of signal generator 104a. A person of ordinary skill in the art would understand that first system 102 may also comprise one or more actuators, sensors, and/or other devices in various embodiments, as well.

As discussed above, low information signals egressed from or ingressed by second system 104 (from signal generator 104a) may be vulnerable to attack due to the inability to effectively secure such signals. Embodiments of the technology disclosed herein utilizes a one-time pad (OTP) system in order to add needed complexity to the low information, simple data signals to reduce an attacker's ability to intercept legible signals if snooping or tapping environment 100. In various embodiments, second system 104 may include an OTP key mixer 110 disposed between signal generator 104a and first system 102. OTP key mixer 110 is provided to apply an OTP key 130 to a signal received by or sent from signal generator 104a. In various embodiments, OTP key mixer 110 may be included within signal generator 104a, disposed on a pin of interest of signal generator 104a, disposed within the substrate material of a circuit board of second system 104 and/or signal generator 104a, or any other position situated along the communication path between signal generator 104a and first system 102. OTP key mixer 110 may include electrical circuitry to apply the OTP key 130 to a digital signal or an analog signal. In some embodiments, OTP key mixer 110 may comprise electrical circuitry for applying the OTP key 130 to either a digital signal or an analog signal, allowing second system 104 to provide pin-level encryption for any type of low-information signals being transmitted. OTP key mixer 110 may comprise electronic circuitry to, add multiply, or otherwise combine signals together to generate a composite output signal or to separate different signals from a composite input signal. In some embodiments, OTP key mixer 110 may include one or more oscillators and/or filters.

In some embodiments, first system 102 may include an OTP key mixer, similar to the OTP key mixer 110 of second system 104. In various embodiments, processor 102a of first system 102 may be configured to perform functions similar to OTP key mixer 110.

Second system 104 may further be communicatively coupled to emanator 106 over a wireless communication channel between antennas 106d, 112. Similar to wired I/O interfaces 102c, 106a, communication between antennas 106d, 112 may be unidirectional. In various embodiments, antenna 106d may be coupled to a transmitter (not shown) and antenna 112 may be coupled to a receiver (not shown), to allow wireless communications via any of a number of communication protocols, including but not limited to, WiFi, Bluetooth, near field communications (NFC), Zigbee, and any of a number of other wireless communication protocols whether standardized, proprietary, open, point-to-point, networked or otherwise. In various embodiments, OTP key mixer 110 may comprise antenna 112 (as shown in FIG. 1A), while in other embodiments antenna 112 may be communicatively coupled to signal generator 104a and configured to route the received OTP key 130 to OTP key mixer 110. In various embodiments, antennas 106d, 112 can comprise components configured to transmit an analog or digital signal.

Embodiments of the technology disclosed herein apply an OTP key 130 to introduce sufficient complexity such that a simple data signal may be secured against would-be attackers. As illustrated in FIG. 1A, an emanator 106 is communicatively coupled to first system 102 and second system 104. In other embodiments, emanator 106 may be co-located with first system 102 and/or second system 104. Emanator 106 is configured to provide the same OTP key 130 to first system 102 and OTP key mixer 110 of second system 104 for each signal to be communicated between the two components. In various embodiments, emanator 106 may include a machine-readable memory 106b configured to store non-transitory executable instructions that, when executed by a processor 106a of emanator 106, causes the transmission of the same OTP key 130 to each of first system 102 and second system 104 over the respective communication channels. In various embodiments, emanator 106 may modulate the OTP key 130 onto a radio frequency (RF) carrier wave for transmission to second system 104. In some embodiments, processor 106a may be configured to apply an encryption or scrambling algorithm to the modulated signal containing the OTP key 130 prior to transmission.

In various embodiments, emanator 106 may comprise one or more of the machine-readable memories and configured to store a plurality of random one-time use keys. In other embodiments, memory 106b may be omitted or not used with respect to the OTP keys, and the non-transitory executable instructions may include instructions to generate a random one-time use key as needed, which is then transmitted to each of first system 102 and second system 104. In various embodiments, the OTP key received at OTP key mixer 110 over mixer antenna 112 (as illustrated in FIG. 1A). In other embodiments, second system 104 may have an antenna configured to receive the signal emanated from emanator 106 and provide the received signal to OTP key mixer 110 over a physical connection (e.g., electrical trace, wired connection, etc.).

As illustrated in FIG. 1A, environment 100A may be configured such the OTP key material may be maintained by emanator 106 in a manner discussed above, and distributed by emanator 106 for a particular message to each of first system 102 and second system 104. FIG. 2 shows an example method 200 for securing a signal between two systems in accordance with embodiments of the present disclosure. For ease of discussion, method 200 shall be discussed with respect to an electronic lock implementation. This example is provided for illustrative purposes only and should not be interpreted as limiting the scope of the claims to only electronic lock implementations. A person of ordinary skill in the art would understand that the technology disclosed herein is applicable to provide further security for low-information or binary signals transmitted within a system.

At operation 202, a signal generator of an embedded system generates a signal to send to a main system. In various embodiments, the embedded system may be similar to second system 104 and main system may be similar to first system 102, discussed with respect to FIG. 1A. The signal generator may comprise one or more components that work together to generate a signal intended for transmission to the main system, similar to signal generator 104a discussed with respect to FIG. 1A. The signal to be sent may be generated based on the signal generator executing one or more software and/or firmware processes. In various embodiments, the embedded system may comprise a system configured to provide a trusted execution environment for executing the one or more software and/or firmware processes, such as a hardware root of trust. As a non-limiting example, the signal generator comprises an authorization mechanism of an electronic door lock. The authorization mechanism is configured to receive one or more identification messages from a locking mechanism and determine whether the identified individual is authorized to unlock the door. After determining that the individual does have authorization, the authorization mechanism generates an ON signal on the POWER pin, to turn on the power for the unlocking mechanism (i.e., the generated signal).

At operation 204, an OTP key received from an OTP emanator is applied to the generated signal to create a secured message. In various embodiments, operation 204 may be performed by an OTP key mixer, like OTP key mixer 110 discussed with respect to FIG. 1A. In various embodiments, the secured message represents a complex representation of the generated signal. By increasing the complexity, implementations in accordance with the technology disclosed herein obfuscates the underlying low-information or binary signal data, making it more difficult for an attacker to decipher the message. Because each message is transformed using a different OTP key, the same low-information or binary message would appear different in each transmission, reducing the ability of an attacker to crack the key. As a non-limiting example, the ON signal may comprise simply setting the signal on the POWER pin to HIGH. Applying the OTP key results in the ON signal being transformed into a more complex message, such as binary code represented as hex (e.g., 0x587FC). The next time a message is to be transmitted, a different OTP key is used. For example, the next ON signal can be transformed using a second OTP key into a different complex signal (e.g., 0x5D50F). Therefore, the ON signal is represented differently each time it is transmitted, meaning that if an attacker were to intercept the signal it would be unable to decipher what the ON signal actually is.

By adding this complexity, embodiments of the present disclosure facilitates the application of encryption techniques to previously non-encryptable messages (i.e., low information or binary messages). In various embodiments, operation 204 may further include applying one or more cryptographic algorithms known in the art to the secured message.

After creating the secured message, the embedded system transmits the secured message to the main system at operation 206. In various embodiments, the embedded system may be communicatively coupled to the main system in a manner similar to the communication link between first system 102 and second system 104 illustrated in FIG. 1A. Referring to the non-limiting electronic lock example, the secured message from the authorization mechanism may be transmitted to the unlocking mechanism over a wired or wireless connection.

Upon receiving the transmitted secured message, the main system decrypts the secured message using its version of the OTP key at operation 208, similar to the operation discussed with respect to FIG. 1A. The emanator transmits the OTP key to both the embedded system and the main system prior to transmission. In this way, each system is capable of encrypting/decrypting the signal to retrieve the original signal. In various embodiments, the emanator may transmit the OTP key to the main system over a wired or wireless connection, similar to the connections discussed with respect to FIG. 1A. Referring to the non-limiting electronic lock example, the main system could recover an original signal indicating that authorization should be granted, such as through powering up a latching mechanism by setting the POWER pin to HIGH.

Figure 3A:
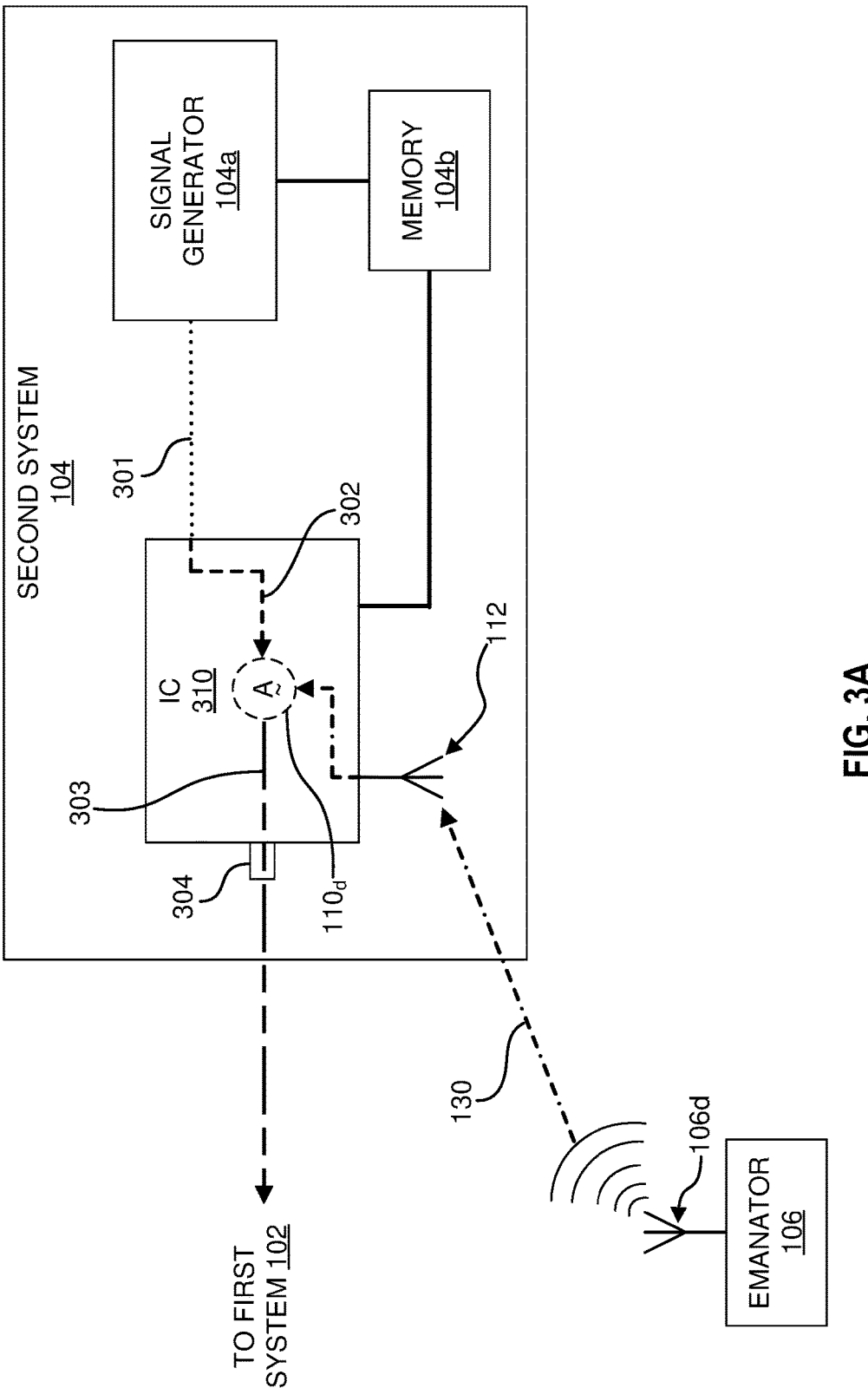
FIG. 3A an example secured pin-level system in accor- dance with embodiments of the technology disclosed herein.
Figure 3B:
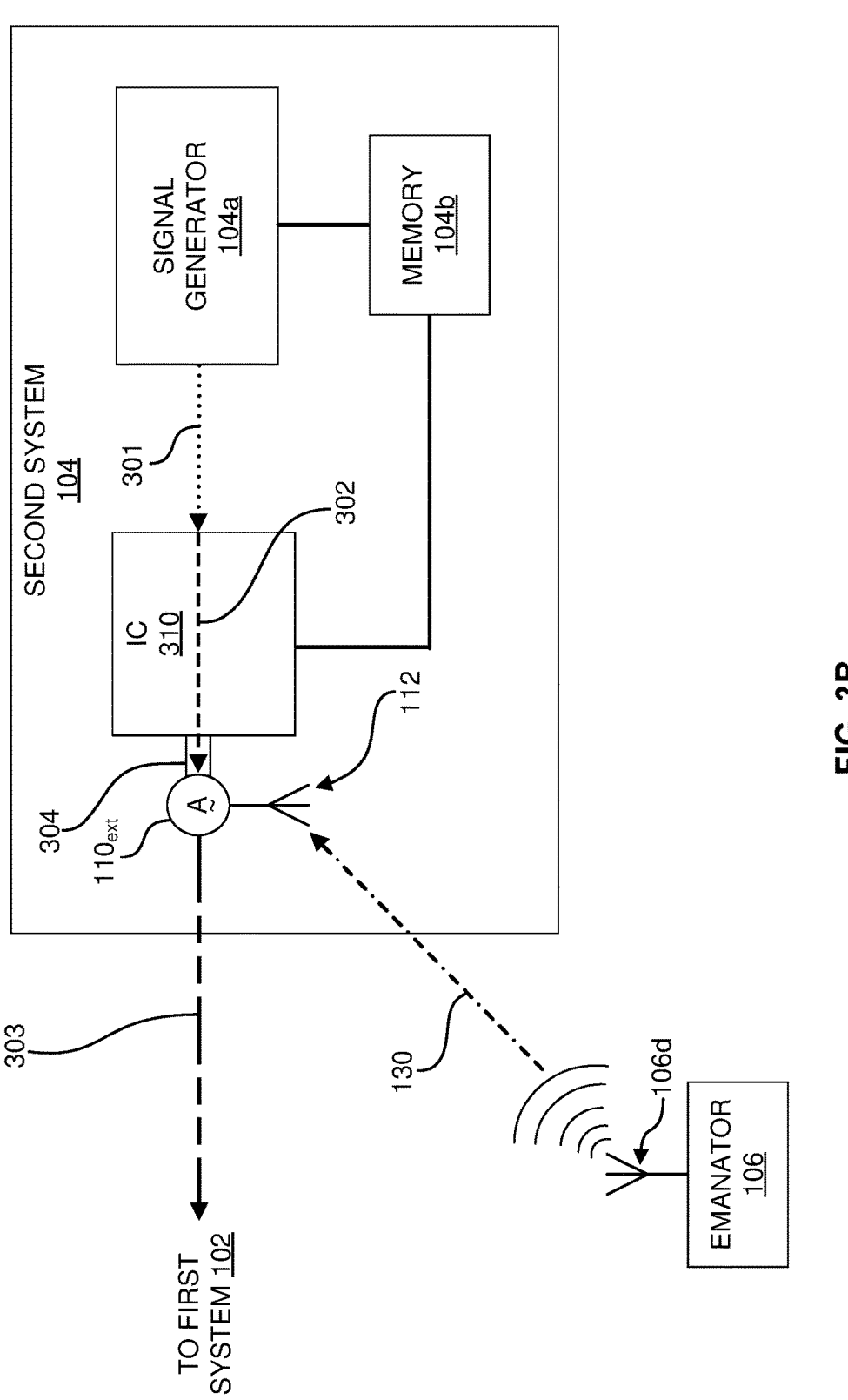
FIG. 3B another example secured pin-level system in accordance with embodiments of the technology disclosed herein.

FIGS. 3A and 3B illustrate different secured pin-level systems 300A-300B in accordance with the technology discussed herein. These embodiments are provided for illustrative purposes only, and should not be interpreted as limiting the scope of the technology to only the embodiments illustrated. FIG. 3A illustrates an example secured pin-level system 300A in accordance with embodiments of the present disclosure. Where references are common between figures it should be interpreted that any discussion regarding those references apply equally unless stated otherwise. As seen in FIG. 3A, secured pin-level system 300A comprises first system 102 (not shown in FIG. 3A), second system 104, and emanator 106. In various embodiments, second system 104 comprises signal generator 104a and memory 104b, similar to second system 104 discussed with respect to FIGS. 1A-1D, and an integrated circuit (IC) 310. Only elements needed to assist in illustrating embodiments of the technology are shown in FIGS. 3A and 3B, for ease of discussion. A person of ordinary skill in the art would understand that generic elements omitted from FIGS. 3A and 3B are present within the system, including but not limited to additional memory units, processors, electrical traces, device input/output (I/O) pins, electrical traces and circuit boards, actuators, logic units, among other common components. Therefore, a person of ordinary skill in the art would understand how to implement embodiments of the technology disclosed herein based on the present disclosure.

In various embodiments, IC 310 may comprise any device configured to receive an output from signal generator 104a. In various embodiments, IC 310 can comprise one or more processing components of second system 104. In some embodiments, IC 310 can comprise an analog-to-digital converter (ADC), a digital-to-analog converter (DAC), or a combination thereof. As shown in FIG. 3A, output signal 301 from signal generator 104a is sent to IC 310. Output signal 301 may be any low-information signal generated within second system 104. In various embodiments, OTP key mixer 110 may be implemented within the digital signal processing code of IC 310 (represented by the broken border of OTP key mixer 310). In such embodiments, OTP key 130 may be received over antenna 112 by IC 310. In various embodiments, antenna 112 may be a component of IC 310, while in other embodiments antenna 112 may be a separate component of second system 104, with antenna 112 and IC 310 are communicatively coupled. In various embodiments, antenna 112 may comprise circuitry for receiving a digital or analog signal.

As illustrated in FIG. 3A, signal generator 104a generates a low-information signal 301 and transmits the low-information signal 301 to IC 310. In various embodiments, signal generator 104a and IC 310 may be communicatively coupled over a wired wireless connection, while in other embodiments the entities may be part of a printed circuit board and communicatively coupled through electrical traces. IC 310 may be configured to process the low-information signal 301 to form a processed signal 302. In some embodiments, processing the low-information signal 301 can comprise converting the low-information signal 301 from a digital into an analog signal or an analog signal into a digital signal.

Processed signal 302 is mixed with OTP key 130 by OTP key mixer 110$_d$ to generate a secured message 303 in various embodiments. OTP key mixer 110$_d$ may be a set of non-transitory machine-readable instructions configured to execute the mixing functionality. OTP key mixer 110$_d$ may comprise firmware or software written in a programming language, such as, for example, Java, C or C++. OTP key mixer 110$_d$, when executed, controls one or more components of IC 310 to mix analog signal 302 and OTP key 130 to create the secured message 303. OTP key mixer 110$_d$ may operate in a similar manner as OTP key mixer 110 discussed with respect to FIGS. 1A-2. IC 310 outputs secured message 303 on output pin 304. In this manner, the previously exploitable low-information signal 301 can be transmitted to first system 102 within secured message 303. Moreover, because a different OTP key 130 is used with each message, the ability of an attacker to decipher secured message 303 through interception of a plurality of secured messages 303 is made more difficult. In various embodiments, IC 310 may be a legacy device within the system in which embodiments of OTP key mixer 110$_d$ is added to by storing OTP key mixer 110$_d$ on memory 104b, flashing OTP key mixer 110$_d$ into IC 310, or any other method of adding functionality within the field. In various embodiments, output pin 304 may be communicatively coupled to a transceiver component of second system 104 through which first system 102 and second system 104 communicate. In other embodiments, output pin 304 may be communicatively coupled to one or more other components of second system 104 before secured message 303 is transmitted.

In various embodiments, the security benefits of the technology disclosed herein can be added to a given system without modification of IC 310 or other components of second system 104a. FIG. 3B illustrates another example secured pin-level system 300B in accordance with embodiments of the present disclosure. FIG. 3B shows an example pin tap embodiment. As shown, OTP key mixer 110$_{ext}$ is connected to output pin 304. In such embodiments, IC 310 is not configured to apply OTP key 130 to low-information signal 301 to generate secured message 303. In FIG. 3B, OTP key mixer 110$_{ext}$ is shown as being disposed on output pin 304 of IC 310, but OTP key mixer 110$_{ext}$ may be a component connected to output pin 304 through an electrical trace, electrical wire, or other circuit connection technique known in the art. Tapping output pin 304 enables the addition of the security facilitated by embodiments of the technology disclosed herein to be added without modification or special configuration of IC 310.

FIG. 4 depicts a block diagram of an example computer system 400 in which various of the embodiments described herein may be implemented. The computer system 400 includes a bus 402, network, crossbar or other communication interconnect mechanism for communicating information, one or more hardware processors 404 coupled with bus 402 for processing information. Hardware processor(s) 404 may be, for example, one or more general purpose microprocessors. In various embodiments, the one or more hardware processors 404 may execute non-transitory machine-readable instructions to perform the various functions of the embodiments discussed with respect to FIGS. 1A-3B.

The computer system 400 also includes a main memory 406, such as a random access memory (RAM), cache and/or other dynamic storage devices, coupled to bus 402 or other communication interconnect mechanism for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 or other communication interconnect mechanism for storing static information and instructions for processor 404. A storage device 410, such as a magnetic disk, optical disk, or USB thumb drive (Flash drive), etc., is provided and coupled to bus 402 for storing information and instructions.

The computer system 400 may further include a display 412, input device 414, and/or a cursor control 616 coupled to bus 402 or other communication interconnect mechanism for displaying, communicating, and entering information and/or commands. In some embodiments, the same direction information and command selections as cursor control may be implemented via receiving touches on a touch screen without a cursor. The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infrared data communications.

The computer system 400 also includes a communication interface 418 coupled to bus 402 or other communication interconnect mechanism for enabling two way communication with one or more networks over one or more network links. For example, communication interface 418 may be an integrated services digital network (ISDN) card, cable modem, satellite modem, a modem to provide a data communication connection to a corresponding type of telephone line, a local area network (LAN), a wide area network, or one or more types of wireless communication links.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the figures accompanying this disclosure and described in the preceding sections are provided for illustrative purposes only, and should not be interpreted as limiting the scope of the present disclosure. The scope of this disclosure is governed by the claims attached hereto and similar embodiments as would be within the ordinary skill of the art, using the same or equivalent elements. The omission of common components, circuits, devices, machines, or other elements which are known in the art to be present in apparatuses and devices in accordance with the present disclosure does not constitute such components falling outside the scope of this disclosure. A person of ordinary skill in the art knows how such common components are utilized and can understand the subject matter without specific recitation of these common components.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (Saas). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, circuitry might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:

a first system communicatively coupled to a second system, the first system comprising a signal generator configured to generate a signal;

a mixer circuit tapped to an output pin of the first system, the mixer circuit configured to receive a key from an emanator circuit and the signal from the signal generator of the first system, create a secured message by applying the key to the signal, and transmit the secured message to the second system; and the emanator circuit communicatively coupled to the first system and the second system and configured to generate and provide the key to the first system and the second system;

wherein the emanator circuit is configured to generate the key such that at least one of:

the key is longer than an underlying message of the signal, or the key contains a higher amount of information than the underlying message of the signal, wherein the higher amount of information contained by the key obfuscates the underlying message of the signal.

2. The system of claim 1, wherein the emanator circuit is configured to generate and provide a new key to the first system and the second system for each subsequent signal from the signal generator such that the new keys are longer than the underlying messages of their corresponding subsequent signals.

3. The system of claim 1, wherein the first system comprises a hardware root of trust.

4. The system of claim 1, wherein the first system further comprises an antenna, and wherein the first system is configured to receive the key from the emanator circuit over a wireless connection.

5. The system of claim 1, wherein the emanator circuit and the second system are connected over a wired connection, and the second system is configured to receive the key over the wired connection.

6. The system of claim 5, wherein the second system is configured to extract the signal from the secured message using the key received from the emanator circuit.

7. The system of claim 1, wherein the first system is an embedded system, the second system is an embedded system, or a combination of both.

8. The system of claim 1, wherein the mixer circuit comprises a set of non-transitory machine-readable instructions executable by one or more processors.

9. The system of claim 1, wherein the signal comprises a single bit digital signal.

10. The system of claim 1, wherein the signal comprises a digital signal, and the first system further comprising a DAC device configured to convert the digital signal into an analog signal.

11. The system of claim 10, wherein the mixer circuit comprises an analog mixer circuit, and applying the key comprises mixing the analog signal with the key.

12. A method comprising:

generating, by a first system, a first signal;

applying, by a mixer circuit tapped to an output pin of the first system, a first key to the first signal to generate a first secured message; and transmitting, by the mixer circuit, the first secured message to a second system;

wherein the first key is generated such that at least one of:

the first key is longer than an underlying message of the first signal, or the first key contains a higher amount of information than the underlying message of the first signal, wherein the higher amount of information contained by the first key obfuscates the underlying message of the first signal.

13. The method of claim 12, further comprising:

generating, by the first system, a second signal, the second signal and the first signal comprising the same data; and applying, by the mixer circuit, a second key to the second signal to generate a second secured message, wherein the first key is different from the second key such that the second secured message is different from the first secured message.

14. The method of claim 12, further comprising: decrypting, by the second system, the first secured message using the first key.

15. The method of claim 12, further comprising receiving, by the mixer circuit, the first key from an emanator, the emanator configured to transmit the first key once.

16. A system, comprising:

a signal generator configured to generate a signal;

an integrated circuit communicatively coupled to the signal generator, the integrated circuit configured to process the signal generated by the signal generator; and a mixer circuit tapped to an output pin of the integrated circuit and configured to receive a key and create a secured message by applying the key to the processed signal, wherein the key is generated such that at least one of:

the key is longer than an underlying message of the signal, or the key contains a higher amount of information than an underlying message of the processed signal, wherein the higher amount of information contained by the key obfuscates the underlying message of the signal.

17. The system of claim 1, wherein the emanator circuit is configured to generate the key such that:

the key is longer than the underlying message of the signal, and the key contains a higher amount of information than the underlying message of the signal.

18. The method of claim 12, wherein the first key is longer than the underlying message of the first signal.

19. The system of claim 16, wherein the key is longer than the underlying message of the processed signal.

* * * * *